(12) United States Patent
Ikeya et al.

(10) Patent No.: US 7,956,275 B2
(45) Date of Patent: Jun. 7, 2011

(54) MUSIC PERFORMANCE TRAINING APPARATUS AND METHOD

(75) Inventors: Tadahiko Ikeya, Hamamatsu (JP); Toshiya Ikegami, Hamamatsu (JP); Takeshi Fuse, Higashikurume (JP); Misa Noguchi, Hamamatsu (JP); Kayoko Sugiyama, Hamamatsu (JP); Yuka Yokota, Kawasaki (JP); Suemi Mizuma, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 12/684,491

(22) Filed: Jan. 8, 2010

(65) Prior Publication Data
US 2010/0175540 A1    Jul. 15, 2010

(30) Foreign Application Priority Data
Jan. 9, 2009   (JP) ................................. 2009-003335

(51) Int. Cl.
*G10H 1/38*   (2006.01)
*G10H 7/00*   (2006.01)
(52) U.S. Cl. ........................................ 84/613; 84/477 R
(58) Field of Classification Search ............ 84/470 R, 84/613, 637
See application file for complete search history.

(56) References Cited

U.S. PATENT DOCUMENTS

| | | | | |
|---|---|---|---|---|
| 4,254,682 A | * | 3/1981 | Machanian et al. | 84/655 |
| 4,864,907 A | * | 9/1989 | Oguri | 84/637 |
| 5,760,325 A | * | 6/1998 | Aoki | 84/613 |
| 5,977,472 A | * | 11/1999 | Ito et al. | 84/637 |
| 6,346,666 B1 | * | 2/2002 | Tsai et al. | 84/637 |
| 6,504,090 B2 | * | 1/2003 | Tsai et al. | 84/615 |
| 6,515,211 B2 | * | 2/2003 | Umezawa et al. | 84/477 R |
| 2002/0023531 A1 | * | 2/2002 | Kira | 84/637 |
| 2002/0035916 A1 | * | 3/2002 | Tsai et al. | 84/622 |

FOREIGN PATENT DOCUMENTS

JP    02-32635 B2    7/1990

* cited by examiner

*Primary Examiner* — Jeffrey Donels
(74) *Attorney, Agent, or Firm* — Rossi, Kimms & McDowell LLP (57) ABSTRACT

Chord to be performed is presented to a user. Chord is detected based on one or more notes performed by the user. When it is not detected that a chord has been duly established, one of the notes performed by the user is detected as a root note of a chord. Comparison is made between the chord presented to the user and the detected chord to make a determination as to whether at least the root note of the detected chord matches the root note of the presented chord. The user is informed of a result of the determination. Thus, not only when the user has accurately executed performance operation for all component notes of the presented chord but also when the user has executed performance operation for only the root note of the presented chord, a chord performance evaluation is made, determining that the user has accurately performed.

9 Claims, 3 Drawing Sheets

MUSIC PERFORMANCE TRAINING APPARATUS AND METHOD

BACKGROUND

The present invention relates to music performance training apparatus and methods which present to a user instructions for operating performance operating members (or operators) to allow the user to practice a music performance, and more particularly to a technique arranged to evaluate a user's chord performance by determining that user's chord performance operation is accurate not only when the user has accurately executed performance operation for (i.e., entered) all component notes of an instructed chord but also when the user has executed performance operation only for a root note of an instructed chord.

Heretofore, as one of music performance training functions possessed by electronic music apparatus, such as electronic keyboard instruments, a chord performance training function has been known which sequentially presents names of chords to a user to allow the user (human player or trainee) to actually depress keyboard keys corresponding to the presented chord names and which evaluates a user's performance of each presented or instructed chord by determining whether the user has accurately executed key depression operation for the chord. One example of such a function (or technique) is disclosed in Japanese Patent Publication No. HEI-2-32635 (hereinafter referred to as "the patent literature").

If a user has not accurately executed key depression operation for (i.e., entered) all component notes of a presented or instructed chord, the conventionally-known chord performance practicing function disclosed in the patent literature does not determine that the user's performance or entry of the chord is not accurate. However, it is generally very difficult to accurately execute key depression operation for all of chord component notes from the beginning; particularly, a beginner user can not accurately perform key depression for all of chord component notes even if he or she has tried over and over again, and thus, the user may often get sick of and give up the chord performance practice on the way. Thus, there has been a great demand for a chord performance training apparatus which is constructed to regard or determine user's performance operation to be accurate, not only when the user has accurately executed performance operation for (i.e., entered) all component notes of a presented chord but also when the user has executed simplified performance operation without accurately executing performance operation for (i.e., entered) all component notes of a presented chord.

SUMMARY OF THE INVENTION

In view of the foregoing, it is an object of the present invention to provide an improved music performance training apparatus and method which allow a user to smoothly continue a chord performance practice step by step by determining that a predetermined chord has been entered or performed accurately by the user even when the user has executed key depression operation only for a root of the chord during the chord performance practice.

In order to accomplish the above-mentioned object, the present invention provides an improved music performance training apparatus, which comprises: a performance operation device operable by a user to execute a music performance; a presentation section which presents to the user a chord to be performed; and a chord detection section which detects a chord on the basis of one or more notes corresponding to user's performance operation on the performance operation device. When the chord detection section does not detect that a chord has been duly established, the chord detection section detects, as a root note of a chord, one of the one or more notes corresponding to user's performance operation. The improved music performance training apparatus further comprises: a determination section which compares the chord presented to the user and the chord detected by the chord detection section to make a determination as to whether at least the root note of the detected chord matches the root note of the presented chord; and an information section which informs the user of a result of the determination by the determination section.

When it is not detected that a chord has been duly established, one of the one or more notes corresponding to user's performance operation (i.e., the one or more notes for which the user has executed performance operation) is detected as s a root note of a chord. Then, a comparison is made between the chord presented to the user and the detected chord to make a determination as to whether at least the root note of the detected chord matches the root note of the presented chord. The user is informed of a result of the determination. Thus, not only when the user has accurately executed performance operation for (i.e., entered) all component notes of the presented chord but also when the user has executed performance operation for only the root note of the presented chord, the music performance training apparatus of the invention determines that the user has accurately executed performance operation for the presented chord. Thus, the user is allowed to smoothly continue a chord performance practice step by step; namely, the present invention can efficiently promote improvement of the user's chord performance.

According to the present invention, not only when the user has accurately executed performance operation for all the component notes of the presented chord but also when the user has executed performance operation for only the root note of the presented chord, a chord performance evaluation is made, determining that the user has accurately executed performance operation for the presented chord. Thus, the user is allowed to continue a chord performance practice smoothly step by step.

People often say that, when a person has to learn a chord, it is advisable for the user to go through steps of first remembering the root note of the chord and then a combination of the root note and other component notes of the chord. In this respect too, the present invention is very useful.

The present invention may be constructed and implemented not only as the apparatus invention as discussed above but also as a method invention. Also, the present invention may be arranged and implemented as a software program for execution by a processor such as a computer or DSP, as well as a storage medium storing such a software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION

Figure 1:
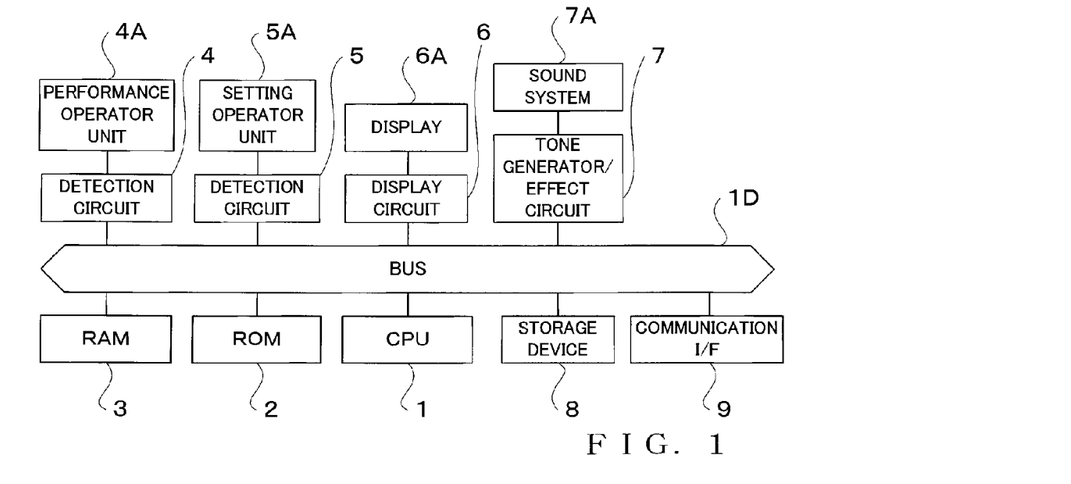
FIG. 1 is a block diagram showing an exemplary embodiment of a general hardware setup of an electronic musical instrument to which is applied a music performance training apparatus in accordance with an embodiment of the present invention.

FIG. 1 is a block diagram showing an exemplary embodiment of a general hardware setup of an electronic musical instrument to which is applied a music performance training apparatus in accordance with an embodiment of the present invention. The electronic musical instrument of FIG. 1 is controlled by a microcomputer including a microprocessor unit (CPU) 1, a read-only memory (ROM) 2 and a random access memory (RAM) 3. The CPU 1 controls operation of the entire electronic musical instrument. To the CPU 1 are connected, via a data and address bus 1D, the ROM 2, RAM 3, detection circuits 4 and 5, display circuit 6, tone generator/effect circuit 7, storage device 8 and communication interface (IF) 9.

The ROM 2 stores therein various programs for execution by the CPU 1 and various data for reference by the CPU 1. The RAM 3 is used as a working memory for temporarily storing various data generated as the CPU 1 executes predetermined programs, as a memory for temporarily storing a currently-executed program and data related to the currently-executed program, and for various other purposes. Predetermined address regions of the RAM 3 are allocated to various functions and used as various registers, flags, tables, temporary memories, etc.

A performance operator unit (or performance operation device) 4A is, for example, a keyboard, which includes a plurality of keys operable to select pitches of tones to be generated and key switches provided in corresponding relation to the keys. The performance operator unit (e.g., keyboard) 4A can be used not only for a manual chord performance by a user (i.e., trainee) itself but also as means for selecting song data to be used a chord performance practice. The detection circuit 4 detects depression and release of keys of the performance operator unit 4A to thereby produce detection outputs.

A setting operator unit 5A includes various operating members (i.e., operators), such as a performance practice switch for starting a chord performance practice, song selection switch for designating song data to be used for a chord performance practice, etc. Of course, the setting operator unit 5A may also include a numeric keypad for inputting numeric value data for selecting, setting and controlling a tone pitch, color, effect, etc., keyboard for inputting characters and letters, and various other operating members, such as a mouse operable to operate a predetermined pointer and the like displayed on a display 6A. The detection circuit 5 detects operating states of the setting operator unit 5A and outputs switch information, corresponding to the detected operating states, etc. to the CPU 1 via the data and address bus 1D.

The display circuit 6 displays, on the display 6A in the form of a liquid crystal display (LCD) panel, CRT or the like, not only various screens, such as a "chord performance practice screen" that presents to the user (trainee) a name of a chord (type of a chord) to be depressed next by the user during a chord performance practice and that displays a chord performance evaluation indicating whether or not the user has accurately performed the chord presented as an object of performance, but also various data currently stored in the ROM 2 and storage device 8, controlling states of the CPU 1, etc.

The tone generator/effect circuit 7, which is capable of simultaneously generating tone signals in a plurality of tone generation channels, receives performance information (e.g., performance information based on accessed music content) supplied via the data and address bus 1D, and generates tone signals by performing tone synthesis on the basis of the received performance information. The tones signals generated by the tone generator/effect circuit 7 are audibly generated or sounded via a sound system 7A including an amplifier and speaker. The tone generator/effect circuit 7 and sound system 7A may be constructed in any desired conventionally-known manner. For example, the tone generator/effect circuit 7 may employ any desired tone synthesis method, such as the FM, PCM, physical model or formant synthesis method. Further, the tone generator/effect circuit 7 may be implemented by either dedicated hardware or software processing performed by the CPU 1.

The storage device 8 stores therein various data, such as song data and accompaniment style data, and various control programs to be executed by the CPU 1. In a case where a particular control program is not prestored in the ROM 2, the control program may be prestored in the storage device (e.g., hard disk device) 8, so that, by reading the control program from the storage device 8 into the RAM 3, the CPU 1 is allowed to operate in exactly the same way as in the case where the particular control program is stored in the ROM 2. This arrangement greatly facilitates version upgrade of the control program, addition of a new control program, etc. The storage device 8 may use any of various removable-type recording media other than the hard disk (HD), such as a flexible disk (FD), compact disk (CD-ROM or CD-RAM), magneto-optical disk (MO) and digital versatile disk (DVD); alternatively, the storage device 8 may comprise a semiconductor memory, such as a flash memory.

The communication interface (I/F) 9 is an interface for communicating control programs and music content between the apparatus and not-shown external equipment (e.g., server apparatus). The communication interface 9 may be a MIDI interface, LAN, Internet, telephone line network or the like. It should be appreciated that the communication interface 9 may be of either or both of wired and wireless types.

In the aforementioned electronic musical instrument, the performance operator unit 4A may be of any other type than the keyboard instrument type, such as a stringed instrument type, wind instrument type or percussion instrument type. Furthermore, needless to say, the electronic musical instrument is not limited to the type where the performance operator unit 4A, display 6A, tone generator/effect circuit 7, etc. are incorporated together as a unit within the apparatus. For example, the electronic musical instrument may be constructed in such a manner that the above-mentioned components are provided separately and interconnected via communication facilities such as a MIDI interface, various networks and/or the like.

Figure 2:
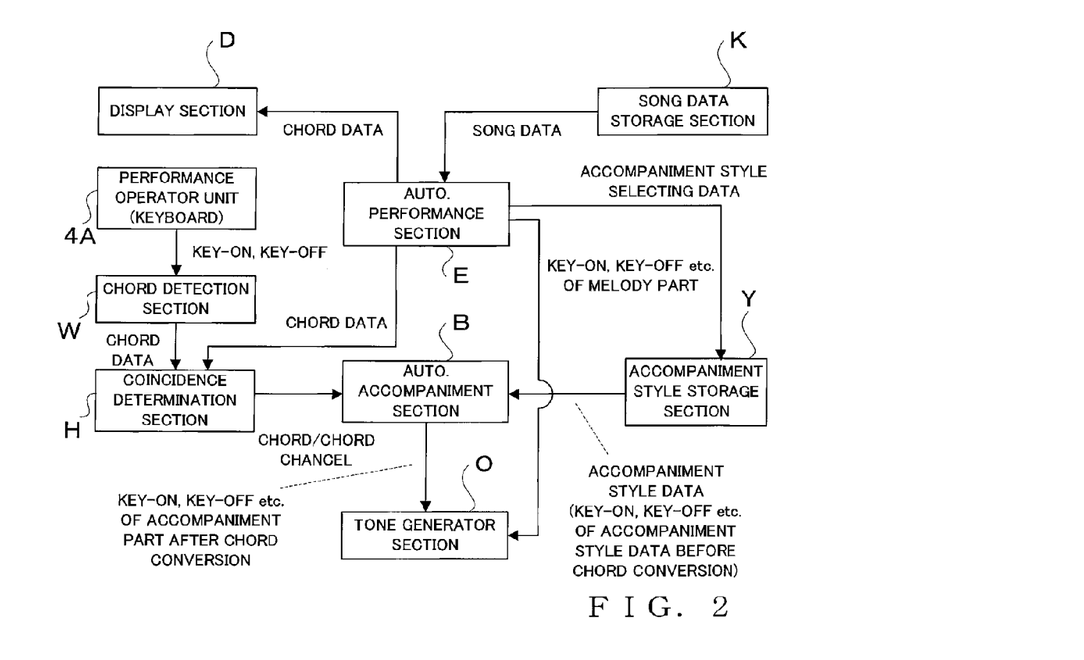
FIG. 2 is a functional block diagram schematically showing an embodiment of the chord performance training function.

The following describe a general outline of the chord performance training function possessed by the aforementioned electronic musical instrument, with reference to FIG. 2 that is a functional block diagram schematically showing an embodiment of the chord performance training function. In the figure, arrows indicate flows of various data and signals. Note that FIG. 2 shows only minimum necessary components of the chord performance training function although the chord performance training function in effect has other components than those shown in FIG. 2.

In response to user's operation of the performance practice switch, an automatic performance section E reads out (i.e., acquires), in accordance with a predetermined tempo, song data from a song data storage section K (e.g., ROM 2) having stored therein a multiplicity of song data. The song data thus read out are user-desired song data selected in advance in response to user's operation of the song selection switch etc. The song data stored in the song data storage section K include performance data of a melody part, chord progression data and accompaniment style selection data.

The automatic performance section E supplies the melody-part performance data (such as data of note events like key-on, key-off and the like) of the read-out song data to a tone generator section O and specifies one accompaniment style data from among a multiplicity of accompaniment style data, stored in an accompaniment style storage section Y (e.g., ROM 2), in accordance with the accompaniment style selection data of the read-out song data. Further, the automatic performance section E supplies a coincidence determination section H and a display section D with chord data (chord information) in a performance order on the basis of the chord progression data. At that time, the automatic performance section E may supply the coincidence determination section H with the chord data by pre-reading out the chord progression data a predetermined short time (e.g., corresponding to a time length of a thirty-second note) earlier than normal timing based on the predetermined tempo or by reading out the chord data at the normal timing.

On the basis of the chord data received from the automatic performance section E, the display section D assists a user's music performance by not only displaying on the display (e.g., LCD) 6A a name of a chord (more specifically, root note and chord type (e.g., major, minor, seventh or the like)) to present to the user a chord to be depressed next, but also presenting, by use of light emitting elements (e.g., LEDs) provided near the performance operator unit 4A, a position of a key to which is assigned the root note of the chord to be depressed next.

The user operates the performance operator unit 4A to enter all of component notes of a chord to be depressed next presented by the display section D, only a root note of the chord, or a combination of the root note and one or more white/black keys pre-determined for the chord, according to a performance ability of the user and according to a desired chord detection scheme (to be described later). In such a case, the user may of course sometimes erroneously enter an inaccurate tone pitch (or tone pitches) or a wrong combination of keys rather than a correct tone pitch or an inaccurate combination of tone pitches by depressing a wrong key (keys). In response to such user's operation of the performance operator unit 4A, performance information comprising note events, such as key-on and key-off events, of tone pitches pre-assigned to the keys is generated and supplied to a chord detection section W. The performance operator unit 4A may be divided in advance into a chord entering key range dedicated to user's entry of chords and another key range than the chord entering key range, or a separate performance operator unit 4A dedicated to entering of chords may be provided in advance. Needless to say, when the chord performance training function is not being executed, the user can execute an ordinary melody performance etc. by operating the performance operator unit 4A.

The chord detection section W detects a chord (root note+ chord type) on the basis of note events, such as key-on and key-off events, of one or more tone pitches entered by the user via the performance operator unit 4A. In the art, there are well known two chord detection schemes: a "fingered chord scheme" which determines a chord on the basis of a coincidence in all of chord component notes (or some of chord component notes for some types of chords) between a user-performed (or user-entered) chord and a chord presented by the chord data; and "single-fingered scheme" which determines a chord on the basis of only a root note or a combination of a root note and one or more black/white keys entered by the user. Importantly, the instant embodiment detects a chord by a so-called "multi-fingered scheme" which is a combination of the above-mentioned "fingered chord scheme" and the "single-fingered scheme". Namely, whether or not a chord has been duly established through chord performance operation by the user is detected by the fingered chord scheme. The chord detection section W can detect a chord not only when the user has accurately entered all of component notes of the chord by accurately operating the performance operator unit 4A without switching operation of a not-shown mode switch (this chord detection is based on the fingered chord scheme), but also when the user has entered only the root note of the chord or a combination of the root note and pitches of one or more white/black keys by operating the performance operator unit 4A (this chord detection is based on the single-fingered scheme). The thus-detected chord is supplied as chord data (chord information) to the coincidence detection section H.

The coincidence detection section H compares the root note of the chord based on the chord data supplied from the chord detection section W (i.e., detected chord) and the root note of the chord based on the chord data supplied from the automatic performance section E (i.e., instructed or presented chord). If the compared two root notes match or coincide with each other, the coincidence detection section H sets the chord data supplied from the automatic performance section E as valid chord data and then supplies the valid chord data to the automatic accompaniment section B. If, on the other hand, the compared two root notes do not match each other, the coincidence detection section H gives a "chord cancel" instruction to the automatic accompaniment section B. The automatic accompaniment section B generates or does not generate automatic accompaniment tones on the basis of specified accompaniment style data (including note events, such as key-on and key-off events, of an accompaniment part before tone pitch conversion based on a chord) or on the basis of the "chord cancel" instruction. The accompaniment style data comprise data of a drum part and data of a non-drum part, and the data of the non-drum part are subjected to the tone pitch conversion based on a chord. Thus, when the chord data have been supplied, the automatic accompaniment section B not only converts tone pitches of individual note events of the non-drum part to match the chord designated by the chord data.

When the "chord cancel" instruction has been given, on the other hand, the automatic accompaniment section B reproduces only a tone of the drum part without reproducing any tone of the non-drum part (i.e., by inhibiting tone generation of the non-drum part). In an alternative, the "chord cancel" instruction is not be given to the automatic accompaniment section B, in which case that the automatic accompaniment section B may maintain tone reproduction of a chord having so far been reproduced for the non-drum part (namely, perform tone pitch conversion of accompaniment style data in accordance with the last chord and reproduce tones of the thus-converted accompaniment style data), or may be supplied with the chord inaccurately entered by the user to thereby generate tones of the non-drum part in accordance with the inaccurately entered chord. Further, the coincidence determination section H determines accuracy/inaccuracy of the user's chord performance operation in accordance with the result of the comparison between the root note of the chord detected by the chord detection section W and the root note of the chord supplied from the automatic performance section E, and causes the display section D to visually display the determined accuracy/inaccuracy of the user's chord performance operation to thereby inform the user of an evaluation about the user's chord performance.

Visual display, by the display section D, of the accuracy/inaccuracy of the user's chord performance operation constitutes an embodiment of an information section for informing the user of the result of the determination by the coincidence determination section H. However, the embodiment of the information section is not limited to such a visual display and may be one that audibly inform the user of the result of the determination made by the coincidence determination section H. Further, the display is not limited to performance rating or grading information indicative of accuracy/inaccuracy and may be any other kind of information as long as it represents some reaction to the user-entered chord (root). For example, with the above-described arrangement where, if a user-entered chord (root) is accurate, chord data supplied from the automatic performance section E are set as valid chord data and supplied to the automatic accompaniment section B so that the automatic accompaniment section B generates tones based on the accurately-entered chord, a result of determination (i.e., evaluation) about the user-entered chord (root) can be informed to the user. Further, the above-described arrangement, where, if a "chord cancellation" instruction has been given, tone generation of the non-drum part is inhibited so that only a tone of the drum part is reproduced, can also inform the user of inaccuracy of the user-entered chord (root). Further, even with the above-described alternative arrangement where, if a user-entered chord (root) is inaccurate, tone reproduction of a chord having so far been reproduced for the non-drum part is maintained without a "chord cancellation" instruction being given, the result of determination (evaluation) about the user-entered chord (root) may be informed to the user. Furthermore, the result of determination about a user-entered chord (root) may be informed to the user with the arrangement where, if the user-entered chord (root) is inaccurate, information of the inaccurate user-entered chord is supplied as-is so that tones of the non-drum part are generated in accordance with the inaccurate user-entered chord.

The tone generator section O generates tone signals on the basis of note events, such as key-on and key-off events, etc. of the melody part supplied from the automatic performance section E and note events, such as key-on and key-off events, etc. of the accompaniment part supplied from the automatic accompaniment section B. Needless to say, tone signals are also generated in response to key depression operation on the performance operator unit 4A during a period when the chord performance training function is not being executed, or in response to key depression operation on the other key range than the chord entering key range during a period when the chord performance training function is being executed.

Figure 3:
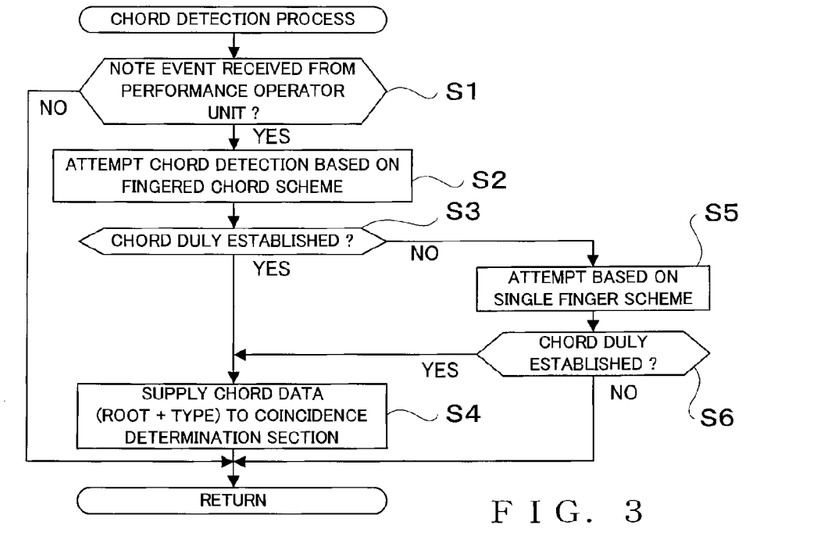
FIG. 3 is a flow chart showing an example operational sequence of a chord detection process performed in the embodiment.

Next, with reference to FIG. 3, a description will be given about a "chord detection process" for implementing the function of the aforementioned chord detection section W, i.e. for detecting a chord in response to user's operation on the performance operator unit 4A. FIG. 3 is a flow chart showing an example operational sequence of the "chord detection process", which is performed by the CPU 1 in response to operation of the performance practice switch.

At step S1, a determination is made as to whether a note event, such as a key-on, key-off event etc., has been received from any of performance operating members (keys) of the performance operator unit 4A in response to user's operation of the performance operating member. If no note event has been received from any one of the performance operating members of the performance operator unit 4A (NO determination at step S1), it means that no chord performance operation has been performed by the user and there is no need to perform a chord detection, and thus, the chord detection process is brought to an end. If, on the other hand, any note event has been received from any of performance operating members of the performance operator unit 4A (YES determination at step S1), a chord detection is attempted based on the aforementioned fingered chord scheme at step S2.

At step S3, a further determination is made as to whether a chord has been duly established on the basis of the chord detection based on the fingered chord scheme. If a chord has been duly established, i.e. the user has performed key depression operation for tones corresponding to all component notes constituting a certain chord (that is not necessarily limited to a chord presented, as an object of performance, by the display section D) (i.e., YES determination at step S3), chord data (root note+chord type) of the detected chord are supplied to the coincidence determination section H at step S4.

On the other hand, if no chord has been duly established, i.e. if the user has performed key depression operation for one or more tones that do not constitute any chord, (NO at step S3), then chord detection based on the aforementioned single-fingered scheme is attempted at step S5. At next step S6, a determination is made as to whether any chord has been duly established on the basis of the chord detection based on the single-fingered scheme. If any chord has been duly established, i.e. if the user has executed key depression operation for only a root note of a certain chord or for a root note of a certain chord plus a combination of one or more white/black keys designating a chord type, (YES determination at step S6), chord data (root note+chord type) of the detected chord are supplied to the coincidence determination section H at step S4. In the case of the chord detection based on the single-fingered scheme, a chord type pre-determined in accordance with a combination of one or more depressed keys is set as conventionally known in the art. Namely, if only one key has been depressed, a major chord having the pitch or note name of the depressed key as its root note is set; if two keys have been depressed and one of the two keys lower in pitch than the other is a white key, a seventh chord type having a note name of the higher pitch as its root note is set; if two keys have been depressed and one of the two keys lower in pitch than the other is a black key, a minor chord type having a note name of the higher pitch name as its root note is set; or the like. If, on the other hand, no chord has been duly established even on the basis of the chord detection based on the single-fingered scheme (NO determination at step S6), the instant chord detection process is brought to an end without detecting a chord.

The above-described embodiment may be modified as follows. Namely, if no chord has been duly established on the basis of the fingered chord scheme (NO determination at step S3), a further determination may be made as to whether a note event of only one note has been generated from the performance operator unit 4A, i.e. whether the user has entered only one note via the performance operator unit 4A, instead of the operations of steps S5 and S6 being performed. If it is determined that the user has entered only one note via the performance operator unit 4A, the one note is supplied, as a note corresponding to a root note of a chord, to the coincidence determination section H; in this case, the chord type is determined to be "none" or "unidentified". Namely, in this case, no chord detection need be performed on the basis of the single-fingered scheme.

Figure 4:
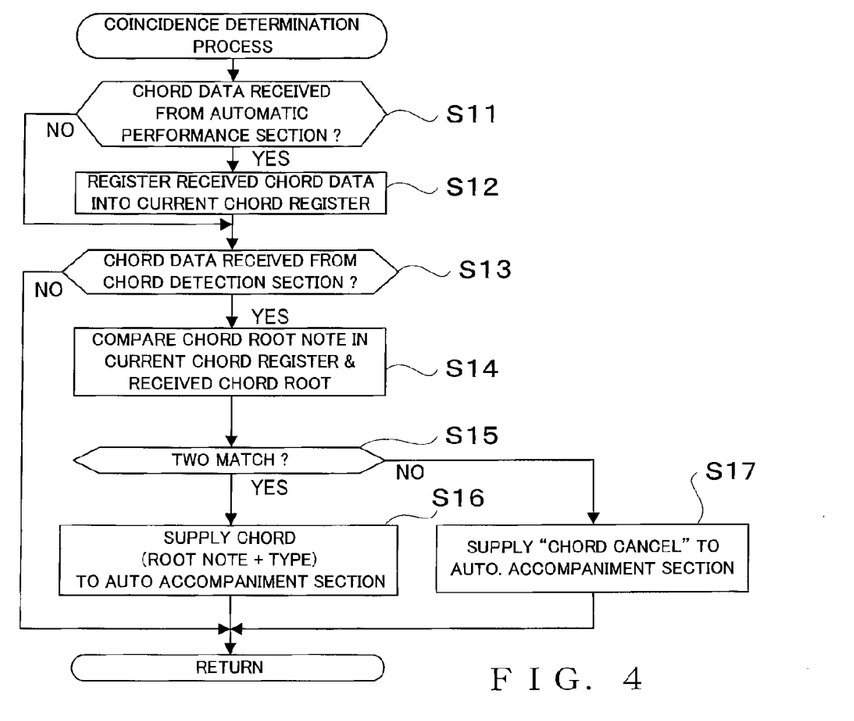
FIG. 4 is a flow chart showing an example operational sequence of a coincidence determination process performed in the embodiment.

Next, with reference to FIG. 4, a description will be given about a "coincidence determination process" for implementing the function of the aforementioned coincidence determination H succeeding the aforementioned chord detection section W, i.e. for comparing a presented chord and a result of chord detection responsive to user's operation. FIG. 4 is a flow chart showing an example operational sequence of the "coincidence determination process", which is also performed by the CPU 1 in response to operation of the performance practice switch.

At step S11, a determination is made as to whether chord data have been received from the automatic performance section E. If no chord data have been received from the automatic performance section E (NO determination at step S11), the coincidence determination process jumps to step S13. If, on the other hand, chord data have been received from the automatic performance section E (YES determination at step S11), the received chord data are registered at step S12 into a current chord register.

At step S13, a determination is made as to whether chord data have been received from the chord detection section W. If no chord data have been received from the chord detection section W (NO determination at step S13), the process is brought to an end. If, on the other hand, chord data have been received from the chord detection section W (YES determination at step S13), a comparison is made at step S14 between a chord root note currently registered in the current chord register and a chord root note included in the received chord data.

At step S15, a determination is made as to whether the chord root note currently registered in the current chord register and the chord root note included in the received chord data match or coincide with each other. If the two chord root notes match each other (YES determination at step S15), the chord (root note+chord type) registered in the current chord register is supplied to the automatic accompaniment section B (step S16). If, on the other hand, the two chord root notes do not match each other (NO determination at step S15), a "chord cancel" instruction is supplied to the automatic accompaniment section B at step S17. The detected chord that does not coincide with the registered chord may be supplied to the automatic accompaniment section B in place of the "chord cancel" instruction, or the last chord may be maintained.

Figure 5:
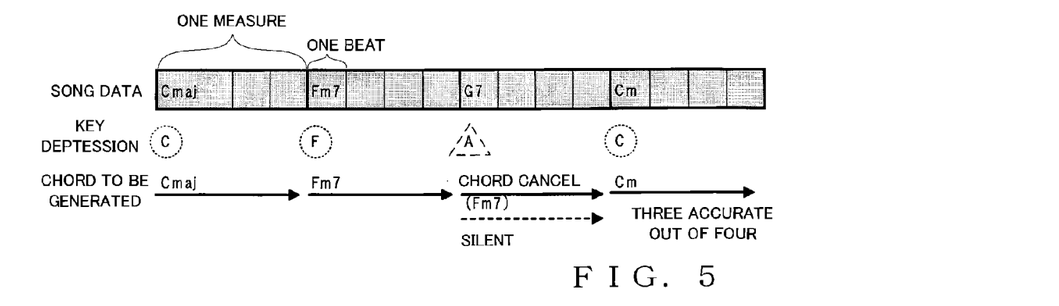
FIG. 5 is a conceptual diagram showing detailed examples of behaviors of a chord detection section and a coincidence determination section in the embodiment.

With reference to FIG. 5, the following describe more details of the chord performance training function shown in FIG. 2, and more particularly detailed examples of the behaviors of the chord detection section W (chord detection process) and the coincidence determination section H (coincidence determination process). In FIG. 5, there are shown, in a top-to-bottom direction, chord data (more specifically, chord progression data included in song data) supplied from the automatic performance section E to the coincidence determination section H, performance information (i.e., only performance information generated as a root note in response to user's key depression operation; this performance information is indicated as "Key Depression" in the figure) supplied from the performance operator unit 4A to the chord detection section W, and chord data or "chord cancel" instruction (indicated as "Chord" in the figure). Here, no description is given about the case where the user has accurately performed key depression operation for all of component notes, because the detected chord and the chord indicated by the chord data naturally coincide with each other and the chord will be sounded accurately. In the illustrated example of FIG. 5, chord data comprising chords "Cmaj, Fm7, G7 and Gm" are supplied, one chord per measure, in a predetermined performance order, i.e. in the order mentioned.

First, the chord detection section W and the coincidence determination section H behave as follows when the "Cmaj" chord has been supplied. Namely, when the user has executed key depression operation for only one note name "C" (as in a case where the user practices performing only chord root notes), a "C major" chord is detected (in the illustrated example of FIG. 5, detected chords are indicated in a different form from chords supplied from the automatic performance section E to distinguish from the latter). In this case, the supplied "Cmaj" chord and the detected "C major" chord are determined to coincide with each other because the root notes of the supplied chord and the detected chord are both "C", so that "Cmaj" supplied from the automatic performance section E is supplied to the automatic accompaniment section B. When the user has executed key depression operation for not only note name "C" but also one or more white/black keys (as in a case where the user practices performing chords with the single-fingered scheme in mind), not only the "C major" chord but also the "C minor", "C seventh", "C minor seventh" chords, etc. may be detected on the basis of a combination of the white/black keys. In such a case too, the supplied "Cmaj" chord and any one of the detected chords are determined to coincide with each other because the root note of the supplied chord and the detected chord are both "C", so that "Cmaj" supplied from the automatic performance section E is supplied to the automatic accompaniment section B. Namely, in each of the aforementioned two cases (i.e., operation styles), the user's performance operation is determined to be accurate (so that point "1", for example, is given to the user's performance operation), and the automatic accompaniment section B generates tones of the accompaniment part by performing tone pitch conversion with the "Cmaj" chord.

Second, the chord detection section W and the coincidence determination section H behave as follows when the "Fm7" chord has been supplied. Namely, when the user has performed key depression operation for only one note name "F", an "F major" chord is detected. In this case, the supplied "Fm7" chord and the detected "F major" chord are determined to coincide with each other because the root notes of the supplied chord and the detected chord are both "F", so that "Fm7" supplied from the automatic performance section E is supplied to the automatic accompaniment section B. When the user has performed key depression operation for not only a sound of pitch name "F" but also one or more white/black keys, not only the "F major" but also the "F minor", "F seventh", "F minor seventh" chords, etc. may be detected. In such a case too, the supplied "Fm7" chord and the detected chords are determined to coincide with each other because the root note of the supplied chord and any one of the detected chords are both "F", so that "Fm7" supplied from the automatic performance section E is supplied to the automatic accompaniment section B. Namely, in each of the aforementioned two cases (i.e., operation styles), the user's operation is determined to be accurate (so that, point "1" is added so that the total point amounts to "2"), and the automatic accompaniment section B generates tones of the accompaniment part by performing tone pitch conversion with the "Fm7" chord.

Third, the chord detection section W and the coincidence determination section H behave as follows when the "G7" chord has been supplied. Namely, when the user has executed key depression operation for only one note name "A", an "A major" chord is detected. In this case, the supplied "G7" chord and the detected "A major" chord are determined to not coincide with each other because the root notes of the supplied chord and the detected chord are different from each other, so that a "chord cancel" is given to the automatic performance section E. When the user has executed key depression operation for not only note name "A" but also one or more white/black keys, not only the "A major" but also the "A minor", "A seventh", "A minor seventh" chords, etc. may be detected. In such a case, the supplied "G7" chord and the detected chords are determined to not coincide with each other because the root note of the supplied chord and the root notes of the detected chords are different from each other, so that a "chord cancel" instruction is given to the automatic accompaniment section B. Namely, in this case, the user's operation is determined to be inaccurate so that no point is added, and the automatic accompaniment section B stops tone generation of the accompaniment part. Making the automatic accompaniment section B silent like this is advantageous in that it can clearly point out the inaccurate operation to the user. Alternatively, the automatic accompaniment section B may generate tones of the accompaniment part using the last supplied chord "Fm7" as a chord to be performed. In another alternative, the "A major" chord for which the user has in accurately executed key depression operation may be supplied to the automatic accompaniment section B so that the automatic accompaniment section B can generate tones of the accompaniment part using the "A major" chord as a chord to be performed.

Fourth, when "Cm" has been supplied from the automatic performance section E, the chord detection section W and the coincidence determination section H behave similarly to the aforementioned second case where the "Fm7" chord has been supplied, except that, for explanation of this fourth case, "Fm7", "F" and "minor seventh" mentioned in the second case should be replaced with "Cm", "C" and "minor", respectively. In this case, the user's operation is determined to be accurate (so that, point "1" is added so that the total point amounts to "3"), and the automatic accompaniment section B generates tones of the accompaniment part by performing tone pitch conversion with the "Cm" chord.

When, for example, the chord designated as an object of performance in the song data is "Cm7" (C minor seventh) having component notes "C", "E♭", "G" and "B♭", the "C major" chord is detected in each of the aforementioned cases in accordance with the single-fingered scheme if the user has entered only "C", and similarly detects the "C major" chord in accordance with the fingered chord scheme if the user has entered "C", "E" and "G". Namely, both when the user has entered only "C" and when the user has entered "C", "E" and "G", the chord detection section W detects the "C major" chord. When the user has entered only "C", the user's operation is determined to be "accurate" as entry operation of the root note of the "Cm7" chord; however, when the user has entered a plurality of notes "C", "E" and "G", it is preferable that the user's operation be determined to be "inaccurate" even if one of the notes of the detected chord is the root note of the "Cm7" chord that is designated as the object of performance, because the entered notes "C", "E" and "G" are different from the component notes "C", "E♭", "G" and "B♭" of the "Cm7" chord. Such a preferred arrangement, however, is not employed in the above-described embodiment.

Figure 6:
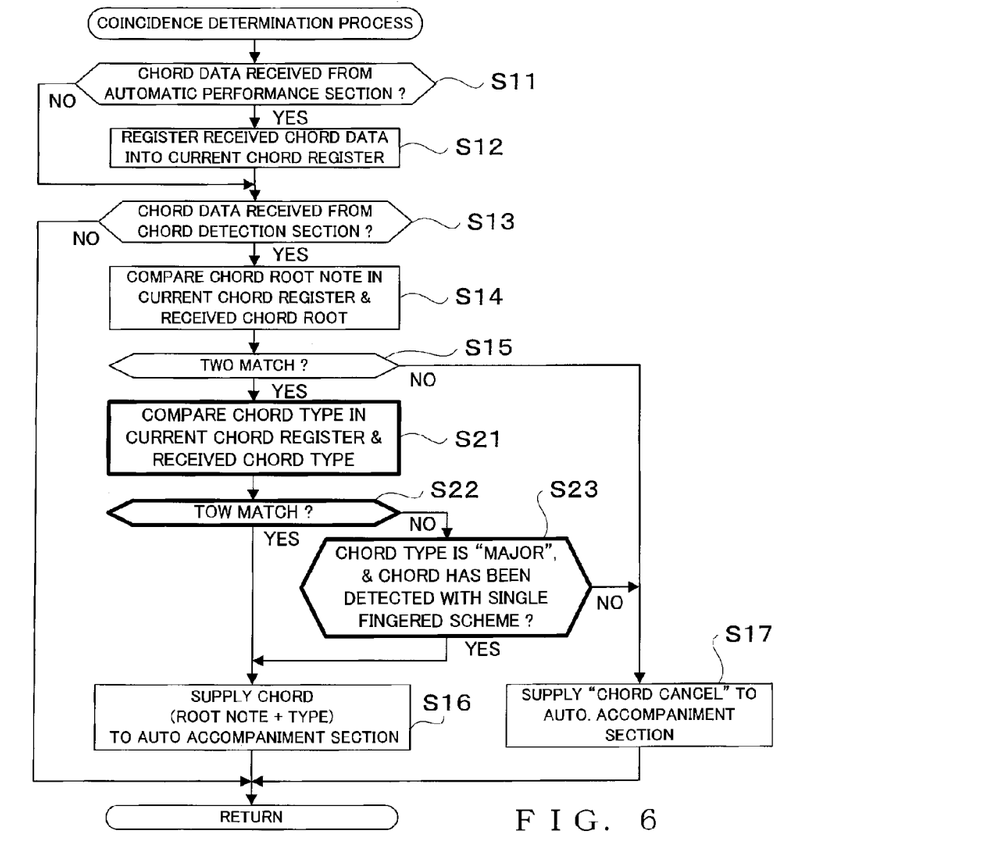
FIG. 6 is another example operational sequence of the coincidence determination process.

In order to implement the aforementioned preferred arrangement, another embodiment of the present invention may be constructed as follows. Namely, when the detected cord type ("major" in the above example) is different from (i.e., does not coincide with) the presented chord type ("minor seventh" in the above example), it may be determined in principle that the user's chord performance operation is "inaccurate", but, even in such a case, the user's chord performance operation may be determined to be "accurate" in terms of the entry of the root note despite the difference in the chord type as long as a "major" chord has been detected on the basis of the "single-fingered scheme". Therefore, FIG. 6 shows another example operational sequence of the "coincidence determination process" for implementing the other embodiment of the present invention, where the same operations as in the embodiment of FIG. 4 are indicated by the same step numbers and will not be described here to avoid unnecessary duplication. The following describe only different operations (steps S21-S23) from those of FIG. 4.

If it has been determined the chord root note currently registered in the current chord register and the chord root note included in the received chord data agree or coincide with each other (YES determination at step S15), a comparison is made at step S21 between the chord type currently registered in the current chord register and the chord type included in the received chord data (i.e, received chord type). At next step S22, a determination is made as to whether the chord type currently registered in the current chord register and the received chord type coincide with each other. If the compared two chord types coincide with each other (YES determination at step S22), the instant process proceeds to step S16.

If, on the other hand, the chord type currently registered in the current chord register and the received chord type do not coincide with each other (NO determination at step S22), a further determination is made, at step S23, as to whether the detected chord type is "major" and the chord has been detected on the basis of the single-fingered scheme. For that purpose, there is provided a chord scheme flag that is set at a value "1" when a chord has been duly established as determined at step S6 of FIG. 3, and the determination as to whether the chord has been detected on the basis of the single-fingered scheme can be made in accordance with the chord scheme flag. If the detected chord type is "major" and the chord has been detected on the basis of the single-fingered scheme (YES determination at step S23), the instant process proceeds to step S16, while, if the detected chord type is "major" but the chord has been detected on the basis of another chord scheme than the single-fingered scheme (NO determination at step S23), the instant process proceeds to step S17. Namely, in this instance, the user's chord performance operation is regarded or determined to be "accurate" only when the chord type is "major", because the chord type, such as "minor" or "seventh", can be detected on the basis of a combination of two or more white/black keys even where the chord has been detected on the basis of the single-fingered scheme.

Further, in the embodiment of FIG. 6 as well, when it has been detected at the time of the chord detection that only one note was entered by the user, it means that "major" has been detected on the basis of the single-fingered scheme, because the fingered chord scheme can not identify any chord on the basis of user's entry of only one note. Namely, when a chord has been detected on the basis of user's entry of only one note, the user's entry can be regarded as root note entry. Thus, in such a case, the determination of step S23 of FIG. 6 may be modified to "has it been detected at the time of the chord detection that only one note was entered by the user", so that the operation of step S16 is performed if it has been detected at the time of the chord detection that only one note was entered by the user while the operation of step S17 is performed if it has not been detected at the time of the chord detection that only one note was entered by the user.

In the electronic musical instrument employing the music performance training apparatus of the present invention, as set forth above, when a chord could be detected on the basis of performance information input in response to user's operation of the performance operator unit 4A, the user's operations is regarded or determined to be "accurate" as long as at least the root note of the component notes of the detected chord is accurate, so that automatic performance tones are generated on the basis of the chord supplied from the automatic performance section E. Namely, not only when the user has accurately performed performance operation for (i.e., entered) all component notes of a presented or instructed chord but also when the user has performed performance operation for (i.e., entered) only the root note of the instructed chord, the present invention makes a chord performance evaluation, determining that the user has accurately performed performance operation for the instructed chord. Thus, the user (trainee) is allowed to continue a chord performance practice smoothly step by step.

Note that the above-described chord performance training function of the present invention may be provided as an independent function in the electronic musical instrument or may be provided in one of a series of music performance practicing or training steps.

Also note that the execution order of the "single-fingered scheme" and the "fingered chord scheme" is not limited to the aforementioned; namely, any desired one of the "single-fingered scheme" and the "fingered chord scheme" may be executed first.

Further, whereas the "single-fingered scheme" has been described above as determining a chord type on the basis of a combination of white/black keys when the user has simultaneously depressed (i.e., operated) two or more keys (i.e, performance operating members) to enter two or more notes, the "single-fingered scheme" may be a scheme different from the above-described, such as one that determines a chord type on the basis of the number of depressed keys without regard to a combination of white/black keys. Further, the "single-fingered scheme" may be a scheme that detects only one note to uniformly detect a "major" chord type, or a scheme in accordance with which a key or scale is designated and only one note is detected as a diatonic chord having the note as its root note.

Furthermore, the embodiments of the invention have been described in relation to the case where performance data of the melody part, chord progression data and accompaniment style designating data are contained in song data. Alternatively, only chord progression data may be contained in the song data, in which case an accompaniment style may be designated separately by the user and performance data of the melody part may be generated and input as necessary in response to a performance by the user.

Further, user's chord performance operation may be graded or scored in accordance with results of the chord coincidence determination, and the results of the chord coincidence determination may be visually displayed. At that time, the scoring may be differentiated between coincidence in root note alone and coincidence in all chord component notes. Further, only results of affirmative coincidence determinations, such as "coincidence in root note" and "coincidence in chord", may be displayed.

Furthermore, whereas the embodiments of the present invention have been described above in relation to the case where, as a display of a chord to be performed, a chord name (root note+chord type) of the chord is displayed by the LCD while the root note of the chord is displayed by the light emitting elements (e.g., LEDs) provided near the performance operator unit, only one of the chord name (root note+chord type) and the chord (root note) may be displayed. In another alternative, all chord component notes may be displayed by the light emitting elements provided near the performance operator unit. In still another alternative, a display section simulating the performance operator unit may be provided in the LCD so that a root note or component notes of a chord to be performed can be displayed on the display section simulating the performance operator unit.

Furthermore, when no chord data have been received from the chord detection section (i.e., the user has not performed key depression operation to enter a chord) although chord data have been received from the automatic performance section, an automatic accompaniment may be reproduced on the basis of the chord data received from the automatic performance section.

It should be appreciated that the music performance training g apparatus of the present invention may be applied to any other electronic music apparatus and equipment etc. than electronic musical instruments as described above, such as personal computers, karaoke apparatus, game apparatus, portable communication terminals like portable phones and piano players. Where a portable communication terminal is used, for example, all of predetermined functions need not be performed by the portable communication terminal alone, in which case the server may have some of the functions so that the above-described functions can be achieved by an entire system comprising the terminal and the server.

The present application is based on, and claims priority to, Japanese Patent Application No. 2009-003335 filed on Jan. 9, 2009. The disclosure of the priority application, in its entirety, including the drawings, claims, and the specification thereof, is incorporated herein by reference.

What is claimed is:

1. A music performance training apparatus comprising:
   a performance operation device operable by a user to execute a music performance;
   a presentation section which presents to the user a chord to be performed;
   a chord detection section which detects a chord on the basis of one or more notes corresponding to user's performance operation on said performance operation device, wherein, when said chord detection section does not detect that a chord has been duly established, said chord detection section detects, as a root note of a chord, one of the one or more notes corresponding to user's performance operation;
   a determination section which compares the chord presented to the user and the chord detected by said chord detection section to make a determination as to whether at least a root note of the detected chord coincides with a root note of the presented chord; and
   an information section which informs the user of a result of the determination by said determination section.

2. The music performance training apparatus as claimed in claim 1, wherein, when said chord detection section does not detect that a chord has been duly established and only if a number of notes for which the user has executed performance operation at one time on said performance operation device is only one, said chord detection section detects the only one note as a root note of a chord.

3. The music performance training apparatus as claimed in claim 1, wherein, when said chord detection section does not detect that a chord has been duly established, said chord detection section determines, only on condition that the root note of the detected chord matches the root note of the presented chord, that the presented chord and the detected chord coincide with each other, but, when said chord detection section detects that a chord has been duly established, said chord detection section does not determine, only on condition that the root note of the detected chord matches the root note of the presented chord, that the presented chord and the detected chord coincide with each other.

4. The music performance training apparatus as claimed in claim 1, wherein said chord detection section detects, on the basis of a chord detection method based on a fingered chord scheme, that a chord has been duly established, and detects, on the basis of a chord detection method based on a single-fingered scheme, the one note as a root note of a chord.

5. The music performance training apparatus as claimed in claim 1, which further comprises an automatic accompaniment section which executes an automatic accompaniment, and wherein, when said determination section has determined that at least the root note of the detected chord matches the root note of the presented chord, said information section informs the user of the result of the determination made by said determination section by supplying information of the presented chord to said automatic accompaniment section to cause said automatic accompaniment section to generate automatic accompaniment tones in accordance with the presented chord.

6. The music performance training apparatus as claimed in claim 5, wherein, when said determination section has determined that at least the root note of the detected chord does not match the root note of the presented chord, said information section informs the user of the result of the determination made by said determination section by causing said automatic accompaniment section to generate automatic accompaniment tones in accordance with the root note of the detected chord.

7. The music performance training apparatus as claimed in claim 1, which further comprises an automatic accompaniment section which executes an automatic accompaniment comprising a drum part and a non-drum part, and wherein, when said determination section has determined that at least the root note of the detected chord does not match the root note of the presented chord, said information section informs the user of the result of the determination made by said determination section by causing said automatic accompaniment section to generate tones of only the drum part.

8. A music performance training method using a performance operation device, said music performance training method comprising:

a presentation step of presenting to the user a chord to be performed;

a chord detection step of detecting a chord on the basis of one or more notes corresponding to user's performance operation on the performance operation device, wherein, when said chord detection step does not detect that a chord has been duly established, said chord detection step detects, as a root note of a chord, one of the one or more notes corresponding to user's performance operation;

a determination step of comparing the chord presented to the user and the chord detected by said chord detection step to make a determination as to whether at least a root note of the detected chord matches a root note of the presented chord; and a step of informing the user of a result of the determination by said determination step.

9. A computer-readable storage medium containing a group of instructions for causing a computer to perform music performance training method using a performance operation device, said music performance training method comprising:

a presentation step of presenting to the user a chord to be performed;

a chord detection step of detecting a chord on the basis of one or more notes corresponding to user's performance operation on the performance operation device, wherein, when said chord detection step does not detect that a chord has been duly established, said chord detection step detects, as a root note of a chord, one of the one or more notes corresponding to user's performance operation;

a determination step of comparing the chord presented to the user and the chord detected by said chord detection step to make a determination as to whether at least a root note of the detected chord matches a root note of the presented chord; and a step of informing the user of a result of the determination by said determination step.

* * * * *